Aug. 25, 1931. H. GARVER Re. 18,163

TOY BASKET BALL GAME

Original Filed Feb. 3, 1927

INVENTOR
Harold Garver
BY
Arthur E. Brown
ATTORNEY

Reissued Aug. 25, 1931 Re. 18,163

UNITED STATES PATENT OFFICE

HAROLD GARVER, OF MERRIAM, KANSAS, ASSIGNOR OF ONE-HALF TO JAMES THOMAS FINDLAY, OF DICKINSON COUNTY, KANSAS

TOY BASKET BALL GAME

Original No. 1,654,968, dated January 3, 1928, Serial No. 165,672, filed February 3, 1927. Application for reissue filed December 26, 1929. Serial No. 416,728.

This invention relates to games and more especially to a toy basket ball game.

One important object of the invention is to provide a novel and amusing game capable of being played by two or more persons forming opponents or opposed sides or teams and which in its playing will simulate the playing of the well known game of basket ball although the game apparatus is of such size that it can be conveniently placed on a table or stand.

Another important object of the invention is the provision of a novel game of this character wherein the use of springs and other more or less complicated parts are entirely eliminated and the construction is of the simplest character.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1:
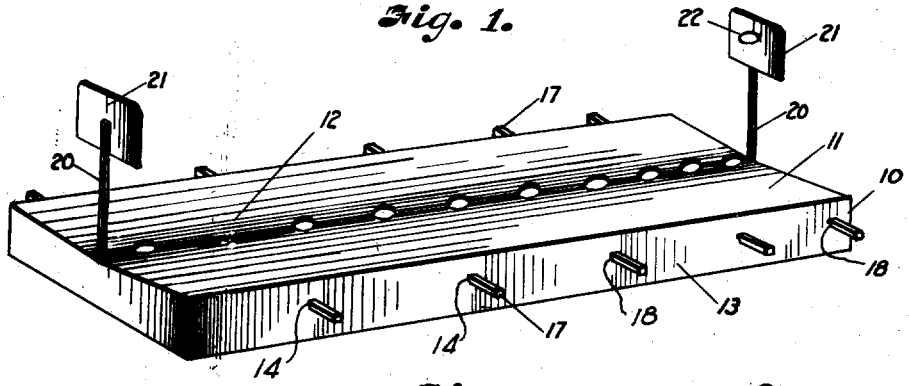
Fig. 1 is a perspective view of the game apparatus.
Figure 2:
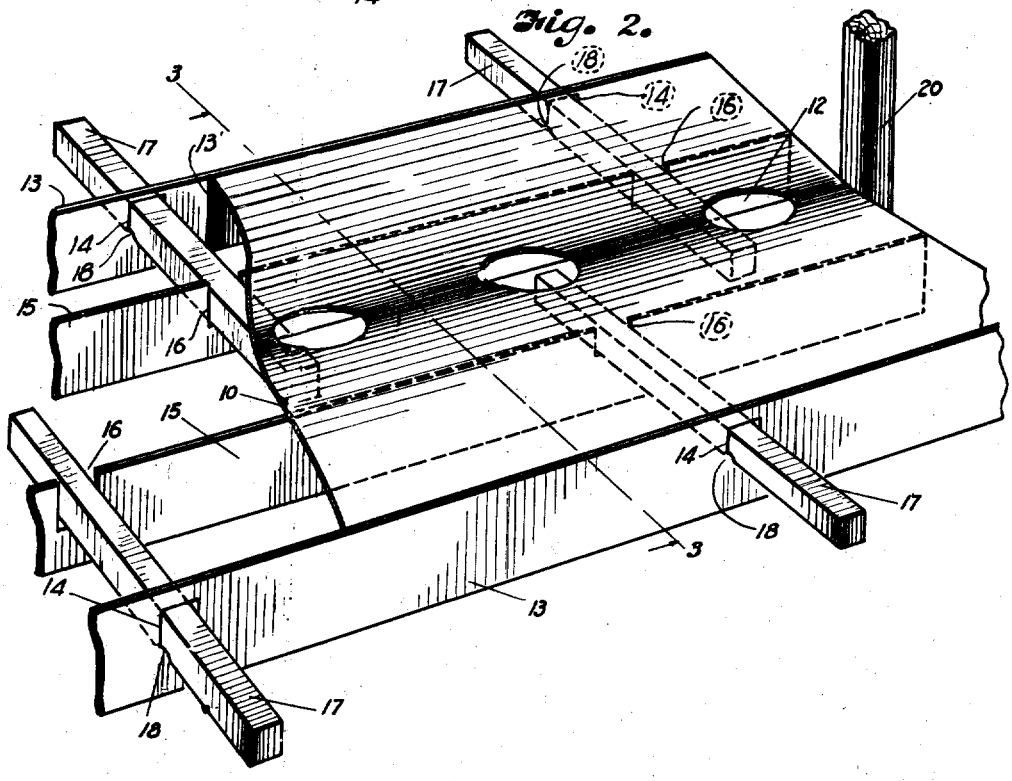
Fig. 2 is an enlarged perspective view of a portion of the game apparatus with the cover or top partially removed to show the internal construction.
Figure 3:
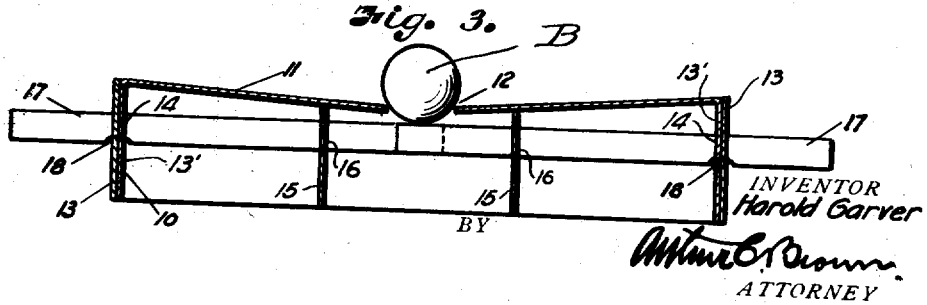
Fig. 3 is a cross section through the device.

In the embodiment of the invention here illustrated it will be seen that there is provided a board member representative of a plane field, preferably in the form of a casing 10, somewhat resembling a shallow box having an inclined top 11 shown divided longitudinally into synclinally arranged halves which meet at the median line of the top. At the bottom of the inclined top and in the form shown along the median line are a number of spaced holes or openings 12 for the reception of a ball B of some light character of considerably greater diameter than the diameters of the holes so that the ball, upon dropping into one of the holes, will have only its lower portion projecting below the top.

The side rails 13 of the casing 10 include reinforcing strips 13′ and provided in said side rails and reinforcing strips are slots 14 arranged nearly opposite the centers of the holes 12, but slightly to one side or the other of said center lines toward one end or the other of the board; the slots at one side of the board being all preferably located at the same sides of corresponding holes, and the slots on the other side of the board at the opposite sides of their corresponding holes, for a purpose later described.

Located between the opposite side rails 13 are reinforcing or stiffening ribs 15 having slots 16 aligning with slots 14 in the side rails 13. Positioned in the pairs of slots 14 and 16 are trigger bars 17 having notches 18 in their underedges to engage the side rails at the bottom of the slots 14 to anchor the bars so that the latter may fulcrum on the side rails; the inner ends of the bars being projected beneath corresponding openings 12 in the inclined top, and the outer ends of the bars projecting from the side rails to provide handle portions whereby the bars may be operated as presently described.

It will be seen that these trigger bars have their outer ends projecting through the slots 14 so as to be accessible for depression by the operator's finger. Counting the holes from one end of the casing to the other it will be seen that the trigger bars for the odd numbered holes project from one side of the casing while the trigger bars for the even numbered holes project on the opposite side of said casing. It will be seen that the trigger bars on one side are offset in one direction from the centers of the holes while the trigger bars on the opposite side are offset in the opposite direction. These trigger bars project beneath the holes so that if the ball B be resting in one of the holes and the outer end of the trigger bar be depressed it will be driven out of the hole and toward one end or the other of the casing in accordance with whether the bar is offset in one direction or the other from the center of said hole. At each end of the casing there is provided an upright or post 20 whereon is fixed the simulation of a goal board 21 carrying the usual goal 22 in miniature. The trigger bars for apertures at opposite sides of the center of the board are arranged at increasing distances from the centers of their respective apertures to vary trajection of the object of play and project the object in arcs intersecting the goal.

In playing the game decision is made by lot as to which player or side shall first have possession of the ball and which goal they will attack. It will be noted that there may be as many players as there are trigger bars, one player being assigned to each bar. When the question of first play and goal has been settled the winning player places the ball B in the hole nearest the center which has the trigger bar offset away from the goal to be attacked. The decision as to which player or side plays first may be obtained by dropping the ball from a short distance on the top of the casing and allowing it to roll into one hole or another. In any event one side will have one half of the holes for its play and the other side will have the alternately arranged remaining holes. The side or person starting the game depresses the trigger of the hole in which the ball rests. This drives the ball upward and toward the goal being attacked and the ball may either drop in this goal or fall back onto the board and come to rest in one of the holes. If it drops in the goal the usual count is made and the play starts over. If it drops into another hole belonging to the same player or side that player or side takes a second shot and this continues until the ball drops into a hole belonging to the opposite player or side whereupon that side or player manipulates his trigger bars until either a goal is made or the ball drops into a hole belonging to the first player or side.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

What I claim and desire to secure by Letters Patent is:

1. A toy basket ball game including a casing having a top surface provided with synclinal longitudinally extending half top portions, said top having holes spaced along the synclinal axis, trigger members beneath said holes and arranged to project laterally beyond the sides of the casing fulcrumed for depression of the laterally extending portions by digital operation whereby to move the parts beneath the holes upwardly, said trigger members being arranged alternately for moving a ball towards one end of the casing or the other, and a ball of greater diameter than the holes and adapted to rest in any one of said holes with its lower portion projecting below the top and in the path of the inner end of the respective trigger member.

2. A toy basket ball game including a casing having a top surface provided with synclinal longitudinally extending half top portions, said top having holes spaced along the synclinal axis, trigger members beneath said holes and arranged to project laterally beyond the sides of the casing fulcrumed for depression of the laterally extending portions by digital operation whereby to move the parts beneath the holes upwardly, said trigger members being arranged alternately for moving a ball towards one end of the casing or the other, a ball of greater diameter than the holes and adapted to rest in any one of said holes with its lower portion projecting below the top and in the path of the inner end of the respective trigger member, and notched ribs extending longitudinally of the casing, said trigger members resting in the notches of said ribs.

3. A toy basket ball game including a casing having a top surface provided with synclinal longitudinally extending half top portions, said top having holes spaced along the synclinal axis, trigger members beneath said holes and arranged to project laterally beyond the sides of the casing fulcrumed for depression of the laterally extending portions by digital operation whereby to move the parts beneath the holes upwardly, said trigger members being arranged alternately for moving a ball towards one end of the casing or the other, a ball of greater diameter than the holes and adapted to rest in any one of said holes with its lower portion projecting below the top and in the path of the inner end of the respective trigger member, and goal pockets supported above the casing at each end thereof.

4. A toy basket ball game including a casing having a top surface provided with synclinal longitudinally extending half top portions, said top having holes spaced along the synclinal axis, trigger members beneath said holes and arranged to project laterally beyond the sides of the casing fulcrumed for depression of the laterally extending portions by digital operation whereby to move the parts beneath the holes upwardly, said trigger members being arranged alternately for moving a ball towards one end of the casing or the other, a ball of greater diameter than the holes and adapted to rest in any one of said holes with its lower portion projecting below the top and in the path of the inner end of the respective trigger member, notched ribs extending longitudinally of the casing, said trigger members resting in the notches of said ribs, and goal pockets supported above the casing at each end thereof.

5. In a game of the character described, a board member including a top having spaced apertures and opposite side rails, a set of trigger members fulcrumed on one of the side rails for movement in vertical planes intersecting alternate apertures at the same sides of the center lines thereof, a second set of trigger members fulcrumed on the other side rail for movement in vertical planes intersecting the other alternate apertures at the opposite sides of the center lines thereof, and an object of play freely seatable in any of said apertures and engageable by corresponding trigger members to project the object upwardly and laterally and directions dependent on the angle of contact of the trigger members with the object.

6. A toy basket ball game including a casing having a top surface provided with synclinal longitudinally extending half top portions, said top having holes spaced along the synclinal axis, trigger members beneath said holes and arranged to project laterally beyond the sides of the casing for depression of the laterally extending portions by digital operation whereby to move the parts beneath the holes upwardly, said trigger members being arranged for moving a ball towards one end of the casing or the other, and a ball of greater diameter than the holes and adapted to rest in any one of said holes with its lower portion projecting below the top and in the path of the inner end of the respective trigger member.

7. A game of the character described including a board member having a top surface provided with synclinal longitudinally-extending half top portions, and having holes spaced along the synclinal axis, a ball of greater diameter than the holes and adapted to rest in any one of said holes, and means for projecting the ball from its seat in any of said holes.

8. In a toy basket ball game a casing including a top surface provided with synclinally, longitudinally extending half top portions and having holes spaced therein, trigger members beneath said holes and arranged to project laterally beyond a side of the casing and fulcrumed for depression of the laterally extending portions by digital operation whereby to move the parts beneath the holes upwardly, said trigger members being arranged for moving a ball in a direction determined by relationship of the trigger member to a hole, and a ball of greater diameter than the holes and adapted to rest in any one of said holes with its lower portion projecting below the top and in the path of the inner end of the respective trigger member.

9. In a game of the character described, a board member including a top having an aperture adapted to seat an object of play, an object of play of greater diameter than said aperture and freely seatable therein, and a trigger member fulcrumed to swing in a vertical plane below the aperture and at one side of the center line thereof.

10. In a game of the character described, a board member including a side rail having a trigger slot and a top having an aperture offset from said slot and adapted to seat an object of play, an object of play freely seatable in the aperture and projectable below the board, and a trigger bar fulcrumed in said slot and projecting beneath the aperture to one side of the center thereof.

11. In a game of the character described, a board member including side and inside rails having aligning slots and a top having an aperture offset laterally from the center line of said slots, an object of play freely seatable in said aperture, and a trigger bar fulcrumed in the slot of the side rail, guided and supported in the slot in the inside rail and projecting beneath the aperture at one side of the center thereof.

12. In a game of the character described, a board member including side and inside rails having aligning slots and a top having an aperture offset from said slots, an object of play freely seatable in said aperture, and a trigger bar having a notched portion fulcrumed in the slot of the side rail, guided and supported in the slot in the inside rail and projecting beneath the aperture at one side of the center line thereof.

13. In a game of the character described, a board member including a top having a plurality of spaced apertures forming a line of play, a set of trigger members fulcrumed for vertical movement beneath said top at corresponding sides of the centers of certain of said apertures and transversely of the line of play of an object projected by said trigger members, a second set of trigger members fulcrumed for vertical movement beneath said top at the opposite sides of the centers of other of said apertures and transversely of said line of play, and an object of play freely seatable in any of said apertures and adapted for eccentric contact by said trigger members for upward and lateral projection responsive to such contact.

14. In a game of the character described, a board member including a top having a plurality of spaced apertures forming a line of play, a set of trigger members fulcrumed for vertical movement beneath said top transversely of the line of play of an object projected by said trigger members and at the right hand side of the center line of alternate apertures, a second set of trigger members arranged alternately with half of the first set and fulcrumed for vertical movement beneath said top transversely of said line of play and at opposite sides of the center lines of the remaining apertures, an object of play freely seatable in any of said apertures and adapted for eccentric contact by said trigger members for upward and lateral projection responsive to such contact.

15. In a game of the character described, a board member including a top having spaced apertures forming a line of play and opposite side rails, a set of trigger members fulcrumed on one of the side rails for movement in vertical planes transversely of the line of play of an object projected by said trigger members, and intersecting alternate apertures at the same sides of the center lines of the apertures transverse to said line of play, a second set of trigger members fulcrumed on the other side rail for movement in vertical planes transverse to said line of play and intersecting the other alternate apertures at the opposite sides of the center lines thereof, and an object of play freely seatable in any of said apertures and engageable by corresponding trigger members to project the object upwardly and longitudinally of the top in directions dependent on the angle of contact of the trigger members with the object.

16. A toy basket ball game including a casing having a top surface provided with spaced holes forming a line of play, trigger members beneath said holes arranged off center to the holes and projecting laterally beyond the sides of the casing fulcrumed for depression of the laterally extending portions by digital operation whereby the parts beneath the holes are movable upwardly in planes transverse to the line of play of an object projected by said members, said trigger members being arranged alternately for moving a ball towards one end of the casing or the other, and a ball of greater diameter than the holes adapted to rest in any of said holes with its lower portion projecting below the top and in the path of the inner end of the respective trigger member.

17. In a game of the character described, a board member including a top having an aperture adapted to seat an object of play and forming a line of play, a fulcrumed trigger member having a striking portion movable in a vertical plane transverse to the line of play of an object projected by said member and intersecting the aperture to one side of the center line thereof, and an object of play of greater diameter than said aperture and freely seatable therein.

In testimony whereof I affix my signature.

HAROLD GARVER.